(12) United States Patent
Ikegami

(10) Patent No.: US 6,393,032 B1
(45) Date of Patent: May 21, 2002

(54) WIRELESS LAN SYSTEM AND METHOD OF DRIVING THE SAME

(75) Inventor: Yoshikazu Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/100,878

(22) Filed: Jun. 22, 1998

(30) Foreign Application Priority Data

Jun. 23, 1997 (JP) .............................................. 9-165721

(51) Int. Cl.$^7$ ............................................ H04L 12/413
(52) U.S. Cl. ...................................... 370/447; 370/338
(58) Field of Search ................................ 370/445, 401, 370/338, 277, 447, 448, 443, 450, 462; 375/222

(56) References Cited

U.S. PATENT DOCUMENTS

| | | | |
|---|---|---|---|
| 4,236,248 A | * 11/1980 | Teramura et al. | 375/53 |
| 4,589,111 A | * 5/1986 | Adachi | 371/32 |
| 4,622,682 A | * 11/1986 | Kumakura | 375/58 |
| 4,661,902 A | * 4/1987 | Hochsprung et al. | |
| 4,837,812 A | * 6/1989 | Takahashi et al. | 379/98 |
| 4,924,456 A | * 5/1990 | Maxwell et al. | |
| 5,142,568 A | * 8/1992 | Ogata et al. | 379/100 |
| 5,231,634 A | * 7/1993 | Giles et al. | |
| 5,379,290 A | * 1/1995 | Kleijne | |
| 5,754,947 A | * 5/1998 | Tanabe et al. | |
| 5,774,468 A | * 6/1998 | Maruyama et al. | |
| 5,844,905 A | * 12/1998 | McKay et al. | 370/443 |
| 5,889,772 A | * 3/1999 | Fischer et al. | |
| 5,903,373 A | * 5/1999 | Welch et al. | 359/152 |
| 6,014,087 A | * 1/2000 | Krishnakumar et al. | |

FOREIGN PATENT DOCUMENTS

| JP | 7-307977 | 11/1995 |
|---|---|---|
| JP | 10-93564 | 4/1998 |

OTHER PUBLICATIONS

Draft Standard IEEE 802.11 Wireless LAN published on Dec. 1, 1994, p. 77.

Japanese Office Action, dated Apr. 18, 2000, with English language translation of Japanese Examiner's comments.

* cited by examiner

*Primary Examiner*—Douglas Olms
*Assistant Examiner*—Ken Vanderpuye
(74) *Attorney, Agent, or Firm*—Whitham, Curtis & Christofferson, P.C.

(57) ABSTRACT

There is provided a wireless LAN system including a wireless terminal which transmits a frame to and receives a frame from other wireless terminals for connecting wireless channel therebetween, and then transmits data to and receives data from the other wireless terminals through the wireless channel. The other wireless terminals stop transmission on receiving the frame from the wire terminal. The wireless terminal is designed to transmit a frame to and receive a frame from the other wireless terminals at a first data transfer rate for connecting wireless channel therebetween, and thereafter transmit data to and receive data from the other wireless terminals at a second date transfer rate greater than the first data transfer rate. The above-mentioned wireless LAN system ensures that wireless channel connection by means of RTS frame or CTS frame is established at a constant data transfer rate, for instance, at 2.0 Mbps, and data is transferred at a high rate, for instance, at 4.8 Mbps. Hence, when data is to be transferred at a high rate in an IEEE 802.11-standardized wireless LAN network area, a wireless terminal which transfers data at a low rate can surely realize establishment of wireless channel connection, resulting in that a problem of hidden wireless terminals can be solved.

11 Claims, 5 Drawing Sheets

WIRELESS LAN SYSTEM AND METHOD OF DRIVING THE SAME

BACKGROUND OF THE INVENTION

1. Field of the Invention

The invention relates to wireless local area network (LAN) system capable of high-rate data transmission through high-rate wireless LAN system compatible with standardized, existing wireless LAN system, and further to a method of driving such wireless LAN system.

2. Description of the Related Art

In a conventional wireless LAN system, there is a problem that since all wireless terminals cannot recognize each other, transmission outputs collide with each other on a wireless channel with the result that a wireless terminal as a receiver cannot normally receive data. In other words, this problem can be set forth as follows. A first wireless terminal starts data transmission while a second wireless terminal is receiving data through a wireless channel, and interferes with normal receipt of data by the second wireless terminal. The first wireless terminal is called a hidden wireless terminal.

In order to solve the problem of a hidden wireless terminal, Japanese Unexamined Patent Publication No. 7-307977 published on Nov. 21, 1995 has suggested a method of communication and a communication apparatus. In the suggested method and apparatus, there is prepared a busy tone channel. A busy tone is transmitted from a particular wireless terminal which transmits and receives data. When other wireless terminals around the particular wireless terminal receive the busy tone through the busy tone channel, the other wireless terminals cease data transmission therefrom. This sort of wireless LAN system is standardized with IEEE 802.11.

FIG. 1 is a timing chart illustrating data to be processed by a conventional wireless LAN system. In a sequence illustrated in FIG. 1, as illustrated in FIG. 1-A, a first wireless terminal as a transmitter transmits RTS frame on a wireless channel through which data communication is to be made. Herein, request to send (RTS) frame means a signal transmitted by a wireless terminal as a transmitter for requesting to make a connection with a wireless terminal as a receiver. In response to RTS frame, a second wireless terminal as a receiver transmits clear to send (CTS) frame as a response signal, as illustrated in FIG. 1-B.

In response to CTS frame, the first wireless terminal as a transmitter transmits a data frame to be transferred, as illustrated in FIG. 1-A. Thereafter, in response to the data frame, the second wireless terminal as a receiver transmits acknowledgement (ACK) frame as a positive response signal, as illustrated in FIG. 1-B. Both RTS and CTS frames contain therein data about a time when ACK frame terminates or falls down.

When another wireless terminal receives RTS frame transmitted from the first wireless terminal, as illustrated in FIG. 1-C, the another wireless terminal ceases data transmission therefrom, from a time when it receives full RTS frame till ACK frame terminates, based on the data contained in RTS frame about a time when ACK frame terminates. On the other hand, if another wireless terminal receives CTS frame transmitted from the second wireless terminal, as illustrated in FIG. 1-D, the another wireless terminal ceases data transmission therefrom, from a time when it receives full CTS frame till ACK frame terminates, based on the data contained in CTS frame about a time when ACK frame terminates.

A modem adopting spectrum scattering process in IEEE 802.11 usually has a data transfer rate in the range of 1 to 2 Mps, and is standardized at a lower data transfer rate than that of wired LAN.

The above-mentioned conventional wireless LAN system has a problem that when a wireless terminal carries out high-rate data transfer in an IEEE 802.11-standardized wireless LAN network area, a lot of hidden wireless terminals which cannot cease data transmission therefrom interfere with normal data receipt of the wireless terminal.

That is, if wireless channel connection is established in an IEEE 802.11-standardized wireless LAN network area through a first modem which is capable of accomplishing high-rate data transfer, a wireless terminal including an IEEE 802.11-standardized second modem accomplishing only low-rate data transfer cannot recognize the wireless channel connection having been established by the first modem, because the first and second modems are different in a data transfer rate. For this reason, there appear a lot of hidden wireless terminals which starts data transmission through a wireless channel while other wireless terminals are making data transmission through the same wireless channel, and as a result, interferes with normal data receipt by the other wireless terminals.

SUMMARY OF THE INVENTION

It is an object of the present invention to provide wireless LAN system which can make it possible to establish wireless channel connection and carry out high-rate data transfer through individual modems, and further can solve the above-mentioned problem of a hidden wireless terminal which starts data transmission through a wireless channel while other wireless terminals are making data transmission through the same wireless channel, and interferes with normal data receipt by the other wireless terminals, when high-rate data transfer is to be carried out in an IEEE 802.11-standardized wireless LAN network area.

It is also an object of the present invention to provide a method of driving wireless LAN system by which the problem of a hidden wireless terminal can be solved.

In one aspect, there is provided a wireless LAN system including a wireless terminal which transmits a frame to and receives a frame from other wireless terminals for connecting wireless channel therebetween, and transmits data to and receives data from the other wireless terminals through the wireless channel, wherein the other wireless terminals stop data transmission on receiving the frame from the wire terminal, the wireless terminal being designed to transmit a frame to and receive a frame from the other wireless terminals at a first data transfer rate for connecting wireless channel therebetween, and thereafter transmit data to and receive data from the other wireless terminals at a second date transfer rate greater than the first data transfer rate.

For instance, the wireless terminal may be designed to include (a) a first modem for carrying out modulation and demodulation to accomplish high-rate data transfer, (b) a second modem for carrying out modulation and demodulation to accomplish low-rate data transfer, (c) a data processor for carrying out data transmission and receipt, and also for selecting one of the first and second modems, and (d) a radio frequency processor for transmitting in radio a signal transmitted from one of the first and second modems;, and also for converting a received signal into a signal to be demodulated by one of the first and second modems.

It is preferable that the first modem is a high-rate data transfer modem, and the second modem is a wireless LAN modem.

The data processor may be designed to transmit a modem switching signal, in which case, it is preferable that the wireless LAN system further includes a switch for alternatively switching the first and second modems in accordance with the modem switching signal.

It is preferable that the data processor is designed, when data is to be transmitted, to select the second modem to thereby transmit RTS frame and receive CTS frame from the other wireless terminals for connecting a wireless channel therebetween, and thereafter, select the first modem to thereby transmit a data frame and receive ACK frame to thereby terminate data transmission. It is also preferable that the data processor is designed, when data is to be received, to select the second modem to thereby receive RTS frame from the other wireless terminals and transmit CTS frame for connecting a wireless channel therebetween, and thereafter, select the first modem to thereby receive a data frame and transmit ACK frame to thereby terminate data transmission.

It is preferable that the first modem is designed to transfer data at a rate of at least 4.8 Mbps. It is also preferable that the second modem is designed to transfer data at a rate of at least 2.0 Mbps.

It is preferable that the wireless LAN system further includes a second data processor electrically connected to the data processor for providing transmission data to the data processor and receiving data through the data processor.

In another aspect of the present invention, there is provided a method of driving wireless LAN system wherein a wireless terminal transmits a frame to and receives a frame from other wireless terminals for connecting wireless channel therebetween, and transmits data to and receives data from the other wireless terminals through the wireless channel, the other wireless terminals stopping transmission on receiving the frame from the wire terminal, the method including the steps of (a) transmitting a frame to and receive a frame from the other wireless terminals at a first data transfer rate for connecting wireless channel therebetween, and (b) transmitting data to and receive data from the other wireless terminals at a second data transfer rate greater than the first data transfer rate.

There is further provided a method of driving wireless LAN system including a first modem for carrying out modulation and demodulation to accomplish high-rate data transfer, and a second modem for carrying out modulation and demodulation to accomplish low-rate data transfer, the method including the steps of (a) selecting the second modem for transmitting RTS frame and receiving CTS frame from the other wireless terminals to thereby connect a wireless channel therebetween, and (b) selecting the first modem for transmitting a data frame and receiving ACK frame to thereby terminate data transmission.

There is still further provided a method of driving wireless LAN system including a first modem for carrying out modulation and demodulation to accomplish high-rate data transfer, and a second modem for carrying out modulation and demodulation to accomplish low-rate data transfer, the method including the steps of (a) selecting the second modem for receiving RTS frame from the other wireless terminals and transmitting CTS frame to thereby connect a wireless channel therebetween, and (b) selecting the first modem for receiving a data frame and transmitting ACK frame to thereby terminate data transmission.

In the above-mentioned wireless LAN system in accordance with the present invention, a wireless terminal transmits and receives a frame for establishment of wireless channel connection to thereby start data communication, and other wireless terminals receiving the frame communication cease data transmission. The wireless terminal transmits and receives a frame for establishing wireless channel connection at a first data transfer rate, for instance, at an IEEE 802.11-standardized data transfer rate of 2.0 Mbps, and transmits and receives data at a second data transfer rate greater than the first data transfer rate, for instance, at an IEEE 802.11-standardized data transfer rate of 4.8 Mbps.

Thus, it is possible to solve a problem of a hidden wireless terminal which interferes with other wireless terminals to normally receive data in an IEEE 802.11-standardized wireless LAN network area. That is, for instance, wireless channel connection is established by means of RTS or CTS frame uniformly at an IEEE 802.11-standardized data transfer rate of 2.0 Mbps. In addition, it is also possible to transfer data at a high rate. In other words, when there is employed a modem capable of transferring at a high rate in an IEEE 802.11-standardized wireless LAN network area, a wireless terminal which transfers data at a low rate can surely recognize establishment of wireless channel connection, resulting in that a problem of hidden wireless terminals can be solved.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
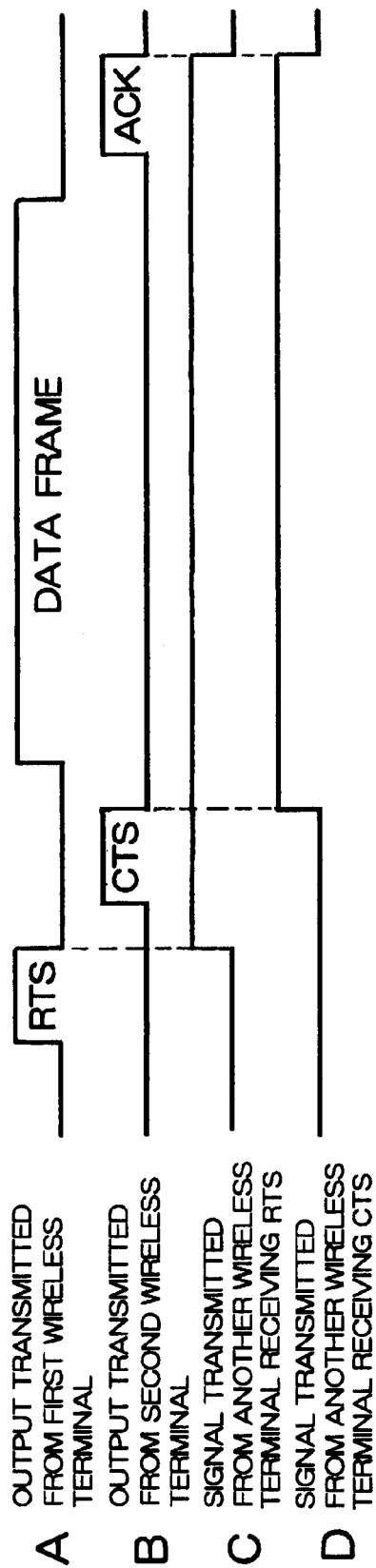
FIG. 1 is a timing chart of a conventional wireless LAN system.
Figure 2:
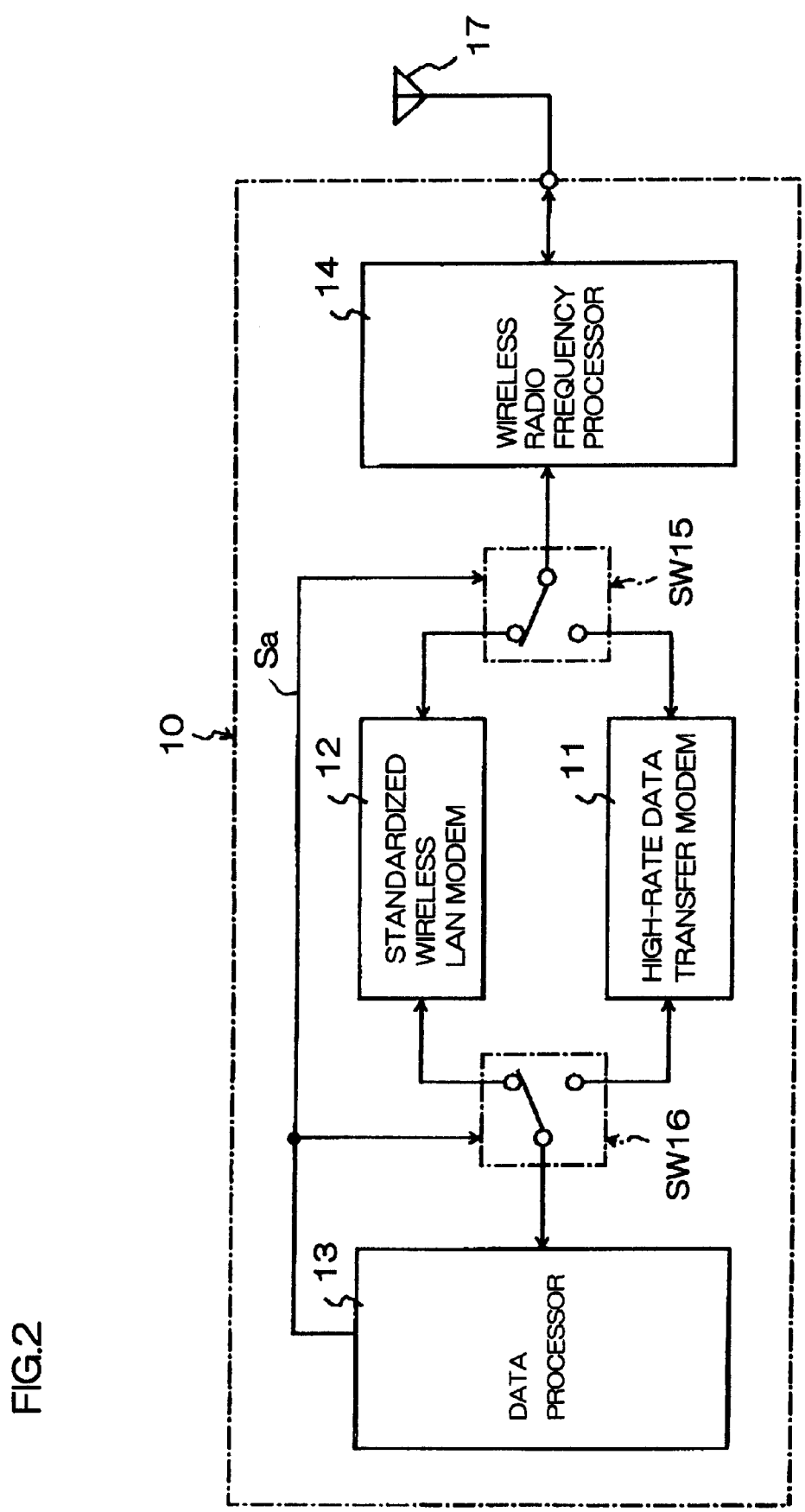
FIG. 2 is a block diagram of a wireless terminal in wireless LAN system in accordance with a preferred embodiment of the present invention.

FIG. 2 is a block diagram illustrating a structure of a wireless terminal to be employed in wireless LAN system in accordance with the first embodiment of the present invention. The illustrated wireless terminal 10 includes a high-rate data transfer modem 11 as a first modem, and a standardized wireless LAN modem 12 as a second modem. The high-rate data transfer modem 11 transmits a data frame and ACK frame associated with the data frame, and modulate or demodulate data for transferring data at a high rate. The standardized wireless LAN modem 12 transmits RTS or CTS frame for establishment of wireless channel connection, and transmits data at a lower rate than that of the high-rate data transfer modem 11. The standard IEEE 802.11 is applied to the wireless LAN modem 12.

The wireless terminal 10 further includes a data processor 13 which transmits data and processes received data, and transmits a modem switching signal Sa in accordance with which one of the high-rate data transfer modem 11 and the standardized wireless LAN modem 12 is selected. The wireless terminal 10 further includes a wireless radio frequency processor 14 which converts a transmission signal transmitted from the high-rate data transfer modem 11 or the standardized wireless LAN modem 12 into a signal having a frequency within a wireless channel frequency range, and transmits the thus frequency-converted signal through an antenna 17. The wireless radio frequency processor 14 converts a wireless channel signal received through the antenna 17 into a signal having a frequency within a certain frequency band so that the high-rate data transfer modem 11 or the standardized wireless LAN modem 12 can modulate or demodulate the frequency-converted signal.

Switches SW15 and SW16 are situated between the data processor 13 and the wireless radio frequency processor 14, and receive the modem switching signal Sa from the data processor 13, and selects one of the high-rate data transfer modem 11 and the standardized wireless LAN modem 12 in accordance with the modem switching signal Sa to thereby electrically connect the high-rate data transfer modem 11 or the standardized wireless LAN modem 12 between the data processor 13 and the wireless radio frequency processor 14.

The wireless terminal 10 having the above-mentioned structure operates as follows.

Figure 3:
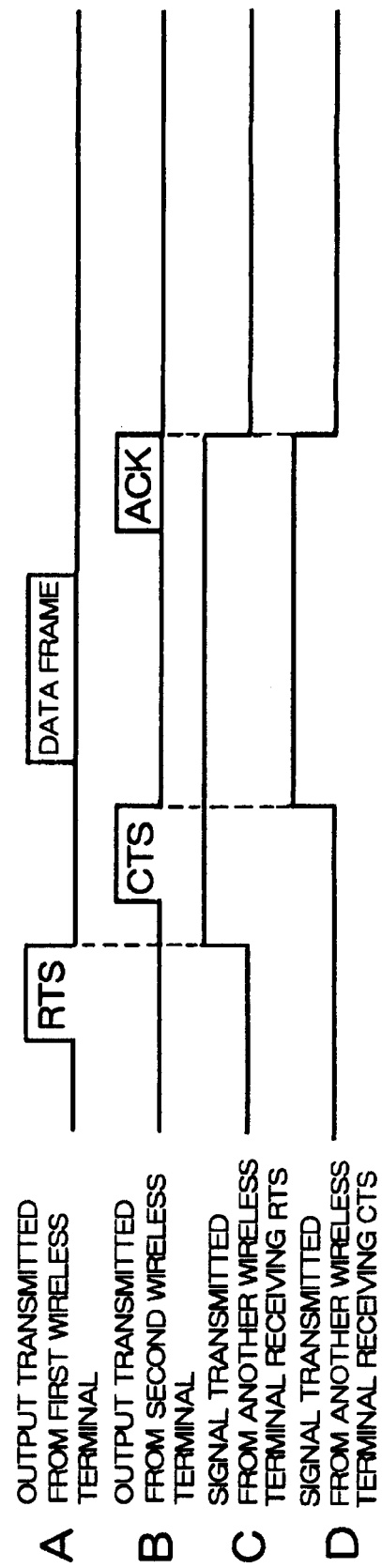
FIG. 3 is a timing chart of the wireless LAN system illustrated in FIG. 2.

FIG. 3 is a timing chart illustrating signals transmitted when the wireless terminal 10 is in operation. First, hereinbelow is explained an operation of the wireless terminal 10 as a data transmitter. With reference to FIGS. 2 and 3, the data processor 13 transmits a modem switching signal Sa to the switches SW 15 and SW16 so that the standardized wireless LAN modem 12 is electrically connected between the data processor 13 and the wireless radio frequency processor 14.

Then, as illustrated in FIG. 3-A, RTS frame, which is a request for establishment of wireless channel connection, is transmitted to a wireless terminal (not illustrated) as a receiver (hereinafter, "a wireless terminal as a receiver" is referred to as "a receiver wireless terminal") from the data processor 13 through the switch SW16, the standardized wireless LAN modem 12, the switch 15, the wireless radio frequency processor 14, and the antenna 17. The receiver wireless terminal also has a structure as illustrated in FIG. 2. In response to the thus transmitted RTS frame, the receiver wireless terminal transmits CTS frame, as illustrated in FIG. 3-B. The data processor 13 of the wireless terminal 10 receives the thus transmitted CTS frame through the antenna 17, the wireless radio frequency processor 14, the switch 15, the standardized wireless LAN modem 12, and the switch 16.

After the data processor 13 has received CTS frame for establishment of wireless channel, the data processor 13 transmits a modem switching signal Sa to the switches SW15 and SW16 so that the high-rate data transfer modem 11 is electrically connected between the data processor 13 and the wireless radio frequency processor 14.

After the high-rate data transfer modem 11 has been selected to connect the data processor 13 to the wireless radio frequency processor 14, high-rate data transfer is carried out through the high-rate data transfer modem 11. That is, data frame is transmitted to the receiver wireless terminal from the data processor 13 through the switch SW16, the high-rate data transfer modem 11, the switch 15, the wireless radio frequency processor 14, and the antenna 17. In response to the thus transmitted data frame, the receiver wireless terminal transmits ACK frame, as illustrated in FIG. 3-B. The data processor 13 of the wireless terminal 10 receives the thus transmitted ACK frame through the antenna 17, the wireless radio frequency processor 14, the switch 15, the high-rate data transfer modem 11, and the switch 16. The data processor 13 processes the thus received data, and then, makes wireless channel open.

Hereinbelow is explained an operation of the wireless terminal 10 when it acts as a data receiver.

The data processor 13 transmits a modem switching signal Sa to the switches SW 15 and SW16 so that the standardized wireless LAN modem 12 is electrically connected between the data processor 13 and the wireless radio frequency processor 14.

The data processor 13 of the wireless terminal 10 receives RTS frame, which was transmitted from the receiver wireless terminal, through the antenna 17, the wireless radio frequency processor 14, the switch 15, the standardized wireless LAN modem 12, and the switch 16. Then, the data processor 13 establishes CTS frame as a response, and transmits the thus established CTS frame to the receiver wireless terminal through the switch SW16, the standardized wireless LAN modem 12, the switch 15, the wireless radio frequency processor 14, and the antenna 17.

Wireless channel connection is established by the above-mentioned communication of RTS and CTS frames between the wireless terminal 10 and the receiver wireless terminal. Thereafter, the data processor 13 transmits a modem switching signal Sa to the switches SW15 and SW16 so that the high-rate data transfer modem 11 is electrically connected between the data processor 13 and the wireless radio frequency processor 14. Then, the data processor 13 of the wireless terminal 10 receives data frame from the receiver wireless terminal through the antenna 17, the wireless radio frequency processor 14, the switch 15, the high-rate data transfer modem 11, and the switch 16. The data processor 13 establishes ACK frame as a response to the thus received data frame, and transmits the thus established ACK frame to the receiver wireless terminal through the switch SW16, the high-rate data transfer modem 11, the switch 15, the wireless radio frequency processor 14, and the antenna 17. Thus, data communication between the wireless terminal 10 and the receiver wireless terminal is completed, and thereafter, the wireless terminal 10 makes wireless channel open.

While the wireless terminal 10 is in communication with the receiver wireless terminal, other wireless terminals cease data transmission therefrom, as illustrated in FIGS. 3-C and 3-D. For instance, when another wireless terminal receives RTS frame transmitted from the wireless terminal 10, as illustrated in FIG. 3-C, the another wireless terminal produces a signal for stopping data transmission therefrom to thereby cease data transmission, from a time when it receives full RTS frame till ACK frame terminates, based on data contained in RTS frame about a time when ACK frame terminates. On the other hand, if another wireless terminal receives CTS frame transmitted from the receiver wireless terminal, as illustrated in FIG. 3-D, the another wireless terminal produces a signal for stopping data transmission therefrom to thereby cease data transmission therefrom, from a time when it receives full CTS frame till ACK frame terminates, based on the data contained in CTS frame about a time when ACK frame terminates.

Figure 4:
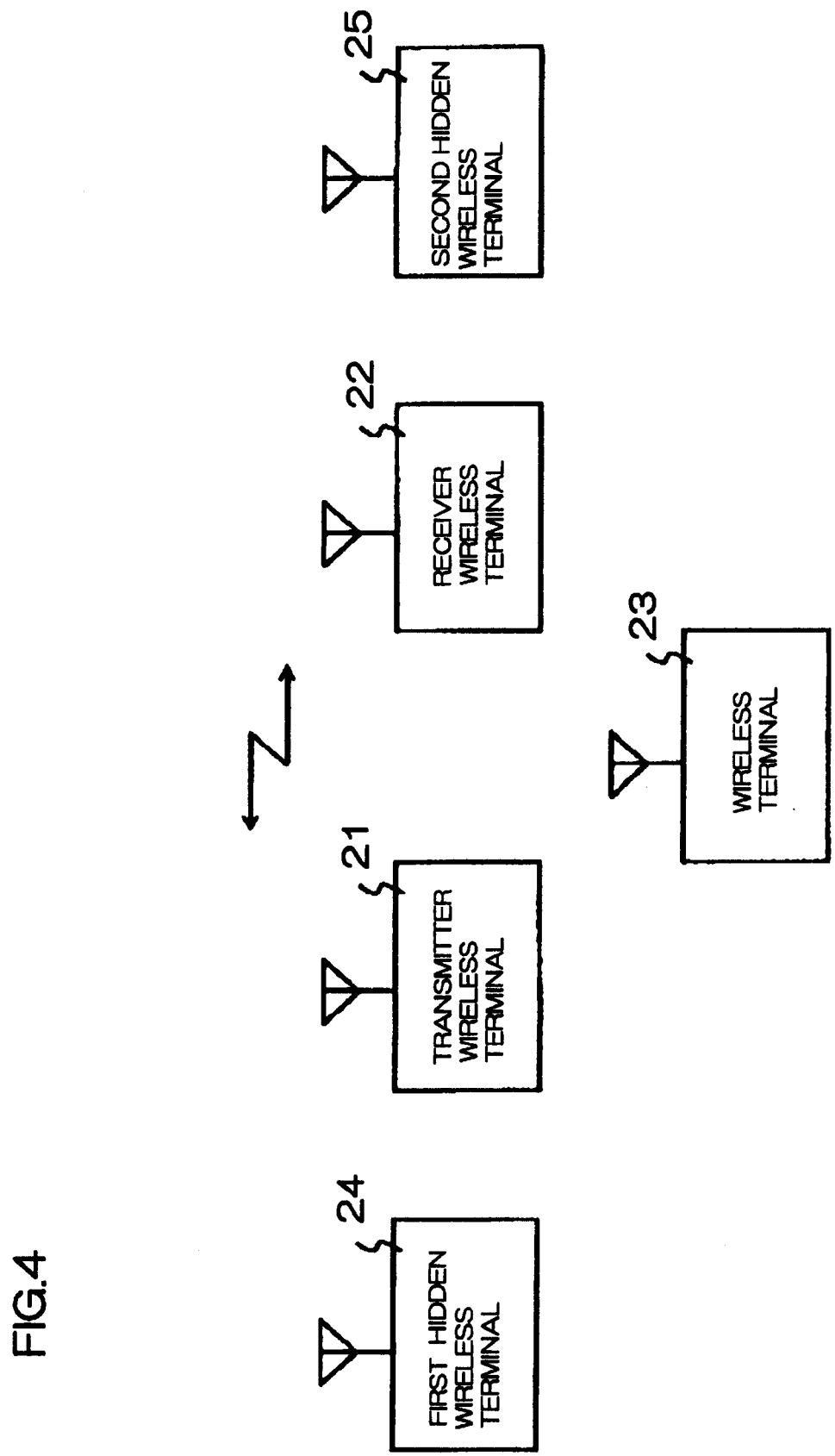
FIG. 4 is a block diagram illustrating a wireless network where a lot of wireless terminals carry out data communication.

FIG. 4 is a block diagram of a wireless network wherein a lot of wireless terminals transmits data to and receives data from one another. The illustrated wireless network includes high-rate wireless LAN system compatible with standardized wireless LAN system, and includes a wireless terminal 21 as a data transmitter (hereinafter, referred to as "a transmitter wireless terminal"). The wireless terminal 21 has the same structure as that of the wireless terminal 10 illustrated in FIG. 3.

The illustrated wireless network further includes a wireless terminal 22 having the same structure as that of the wireless terminal 10 illustrated in FIG. 3 and receiving data transmitted from the wireless terminal 21 (hereinafter, referred to as "a receiver wireless terminal"), a wireless terminal 23 receiving data transmitted from the receiver wireless terminal 21, through an IEEE 802.11-standardized wireless LAN modem 12, a first hidden wireless terminal 24, and a second hidden wireless terminal 25. The first hidden wireless terminal 24 receives data transmitted from the transmitter wireless terminal 21, through an IEEE 802.11-standardized wireless LAN modem 12, and cannot be recognized by the receiver wireless terminal 22. The second hidden wireless terminal 25 receives data transmitted from the receiver wireless terminal 22 when the receiver wireless terminal 22 acts as a transmitter, through an IEEE 802.11-standardized wireless LAN modem 12, and cannot be recognized by the receiver wireless terminal 21.

The wireless network illustrated in FIG. 4 operates as follows.

With reference to FIGS. 3 and 4, the transmitter wireless terminal 21 starts its operation at a time when RTS frame is transmitted, as illustrated in FIG. 3-A, and the receiver wireless terminal 22 starts its operation at a time when CTS frame is received, as illustrated in FIG. 3-B. The wireless terminal 23 and the first hidden wireless terminal 24 start their operation at a time when a wireless terminal receiving RTS frame transmits a signal for stopping data transmission therefrom, as illustrated in FIG. 3-C, and the second hidden wireless terminal 25 starts its operation at a time when a wireless terminal receiving CTS frame transmits a signal for stopping data transmission therefrom, as illustrated in FIG. 3-D.

The transmitter wireless terminal 21 transmits RTS frame containing information about a period of time necessary for completing transmission of a sequence of data, specifically, RTS frame, CTS frame, data frame and ACK frame. When the wireless terminal 23 and the first hidden wireless terminal 24 receive such a sequence of data, they stop data transmission therefrom until the sequence of data is wholly received. The receiver wireless terminal 22 receiving RTS frame transmits CTS frame through the standardized wireless LAN modem 12, and thereafter, selects the high-rate data transfer modem 11.

The second hidden wireless terminal 25 having received CTS frame stops data transmission therefrom until ACK frame terminates. The receiver wireless terminal 22 having received CTS frame through the standardized wireless LAN modem 12 transmits ACK frame, and thereafter, the standardized wireless LAN modem 12. The transmitter wireless terminal 21 having received ACK frame switches the standardized wireless LAN modem 12 to the high-rate data transfer modem 11.

As a result, while data frame and ACK frame is being transmitted, the wireless terminal 23, the first and second hidden wireless terminals 24 and 25 all located in the vicinity of the transmitter wireless terminal 21 and the receiver wireless terminal 22 stop data transmission therefrom. Hence, it is possible to solve a problem of a hidden wireless terminal which cannot stop data transmission therefrom and hence interferes with other wireless terminals to receive data, when high-rate data transfer is to be carried out through the use of the high-rate data transfer modem 11 in an IEEE 802.11-standardized wireless LAN network area.

Figure 5:
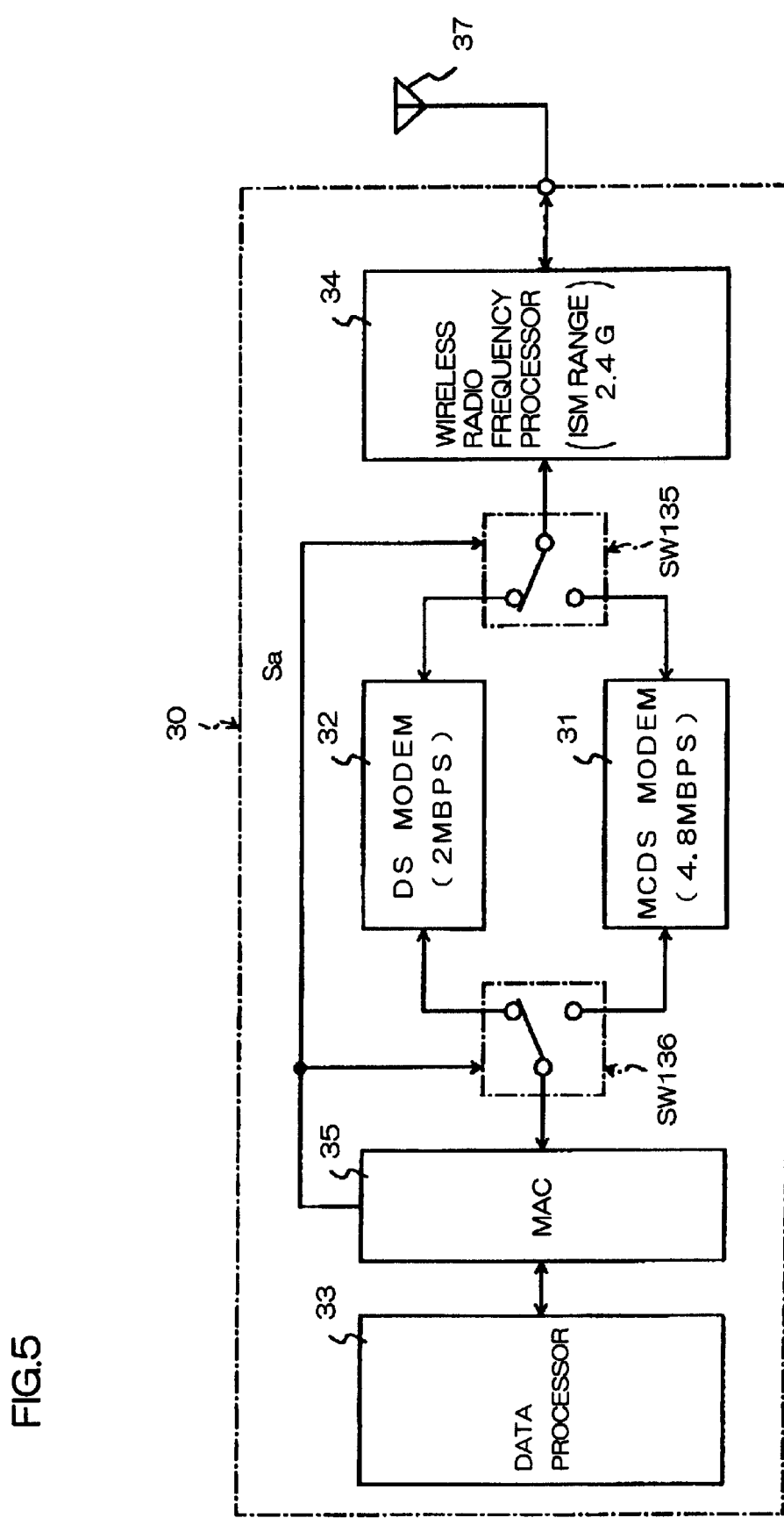
FIG. 5 is a block diagram of a specific structure of the wireless terminal illustrated in FIG. 1.

FIG. 5 is a block diagram illustrating a specific structure of the wireless terminal 10. The illustrated wireless terminal 30 includes MCDS modem 31 as a first modem, and DS modem 32 as a second modem. The MCDS modem 31 transmits a data frame and ACK frame associated with the data frame, and has a data transfer rate of 4.8 Mbps. The DS modem 32 transmits RTS or CTS frame for establishment of wireless channel connection, and has an IEEE 802.11-standardized data transfer rate of 2.0 Mbps.

The wireless terminal 30 further includes MAC 35 which manages a transmission sequence of frame, and transmits a modem switching signal Sa in accordance with which one of MCDS modem 31 and DS modem 32 is selected, and a data processor 33 for transmitting data and processing received data. The wireless terminal 30 further includes a wireless radio frequency processor 34 which converts a transmission signal transmitted from MCDS modem 31 or DS modem 32 into a signal having a frequency within a wireless channel frequency range (ISM range, 2.4 GHz), and transmits the thus frequency-converted signal through an antenna 37. The wireless radio frequency processor 34 converts a wireless channel signal received through the antenna 37 into a signal having a frequency within a certain frequency band so that MCDS modem 31 or DS modem 32 can modulate the thus frequency-converted signal.

Switches SW135 and SW136 are situated between MAC 35 and the wireless radio frequency processor 34, and receive the modem switching signal Sa from MAC 35, and selects one of MCDS modem 31 having a data transfer rate of 4.8 Mbps and DS modem 32 having a data transfer rate of 2.0 Mbps in accordance with the modem switching signal Sa to thereby electrically connect MCDS modem 31 or DS modem 32 between MAC 35 and the wireless radio frequency processor 34.

The wireless terminal 30 operates in the same manner as the wireless terminal 10 illustrated in FIG. 2. That is, wireless terminal 30 operates in accordance with the timing chart illustrated in FIG. 3.

First, hereinbelow is explained an operation of the wireless terminal 30 acting as a data transmitter. First, MAC 35 transmits a modem switching signal Sa to the switches SW 135 and SW136 so that DS modem 32 having a data transfer rate of 2.0 Mbps is electrically connected between MAC 35 and the wireless radio frequency processor 34.

Then, as illustrated in FIG. 3-A, RTS frame, which is a request for establishment of wireless channel connection, is transmitted to a wireless terminal (not illustrated) as a receiver (hereinafter, "a wireless terminal as a receiver" is referred to as "a receiver wireless terminal") from MAC 35 through the switch SW136, the DS modem 32, the switch 135, the wireless radio frequency processor 34, and the antenna 37. The receiver wireless terminal has a structure as illustrated in FIG. 2. In response to the thus transmitted RTS frame, the receiver wireless terminal transmits CTS frame, as illustrated in FIG. 3-B. The data processor 33 of the wireless terminal 30 receives the thus transmitted CTS frame through the antenna 37, the wireless radio frequency processor 34, the switch 135, DS modem 32, the switch 136, and MAC 35.

After the data processor 33 has received CTS frame for establishment of wireless channel, the data processor 33 transmits a modem switching signal Sa to the switches SW135 and SW136 so that MCDS modem 11 having a data transfer rate of 4.8 Mbps is electrically connected between MAC 35 and the wireless radio frequency processor 34.

After MCDS modem 31 has been selected to connect the data processor 33 to the wireless radio frequency processor 34, high-rate data transfer is carried out through MCDS modem 31. That is, data frame is transmitted to the receiver wireless terminal from the data processor 33 through MAC 35, the switch SW136, MCDS modem 31, the switch 135, the wireless radio frequency processor 34, and the antenna 37.

In response to the thus transmitted data frame, the receiver wireless terminal transmits ACK frame, as illustrated in FIG. 3-B. The data processor 33 of the wireless terminal 30 receives the thus transmitted ACK frame through the antenna 37, the wireless radio frequency processor 34, the switch 135, MCDS modem 31, the switch 136, and MAC 35. The data processor 33 processes the thus received data, and then, makes wireless channel open.

Hereinbelow is explained an operation of the wireless terminal 30 when it acts as a data receiver.

The data processor 33 transmits a modem switching signal Sa to the switches SW135 and SW136 so that DS modem 32 having a data transfer rate of 2.0 Mbps is electrically connected between MAC 35 and the wireless radio frequency processor 34.

The data processor 33 of the wireless terminal 30 receives RTS frame, which was transmitted from the receiver wireless terminal, through the antenna 37, the wireless radio frequency processor 34, the switch 135, DS modem 32, the switch 136, and MAC 35. Then, MA 35 establishes CTS frame as a response, and transmits the thus established CTS frame to the receiver wireless terminal through the switch SW136, DS modem 32, the switch 135, the wireless radio frequency processor 34, and the antenna 37.

Wireless channel connection is established by the above-mentioned communication of RTS and CTS frames between the wireless terminal 30 and the receiver wireless terminal. Thereafter, the data processor 33 and MAC 35 transmit a modem switching signal Sa to the switches SW135 and SW136 so that MCDS modem 31 having a data transfer rate of 4.8 Mbps is electrically connected between MAC 35 and the wireless radio frequency processor 34. Then, the data processor 33 and MAC 35 of the wireless terminal 30 receive data frame from the receiver wireless terminal through the antenna 37, the wireless radio frequency processor 34, the switch 135, MCDS modem 31, and the switch 136.

The data processor 33 and MAC 35 establish ACK frame as a response to the thus received data frame, and transmits the thus established ACK frame to the receiver wireless terminal through the switch SW136, MCDS modem 31, the switch 135, the wireless radio frequency processor 34, and the antenna 37. Thus, data communication between the wireless terminal 30 and the receiver wireless terminal is completed, and thereafter, the wireless terminal 30 makes wireless channel open.

While the wireless terminal 30 is in communication with the receiver wireless terminal, other wireless terminals cease data transmission therefrom, as illustrated in FIGS. 3-C and 3-D. For instance, when another wireless terminal receives RTS frame transmitted from the wireless terminal 30, as illustrated in FIG. 3-C, the another wireless terminal produces a signal for stopping data transmission therefrom to thereby cease data transmission, from a time when it receives full RTS frame till ACK frame terminates, based on data contained in RTS frame about a time when ACK frame terminates. On the other hand, if another wireless terminal receives CTS frame transmitted from the receiver wireless terminal, as illustrated in FIG. 3-D, the another wireless terminal produces a signal for stopping data transmission therefrom to thereby cease data transmission therefrom, from a time when it receives full CTS frame till ACK frame terminates, based on the data contained in CTS frame about a time when ACK frame terminates.

As having been explained in connection with the preferred embodiments, the wireless LAN system in accordance with the present invention has a wireless terminal which transmits a frame to and receive a frame from other wireless terminals at a first data transfer rate for establishment of wireless channel connection therebetween, and thereafter transmit data to and receive data from the other wireless terminals at a second date transfer rate greater than the first data transfer rate. The wireless LAN system ensures that wireless channel connection by means of RTS frame or CTS frame is established at a constant data transfer rate, for instance, at 2.0 Mbps, and data is transferred at a high rate, for instance, at 4.8 Mbps. Hence, when data is to be transferred at a high rate in an IEEE 802.11-standardized wireless LAN network area, a wireless terminal which transfers data at a low rate can surely realize establishment of wireless channel connection, resulting in that a problem of hidden wireless terminals can be solved.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-165721 filed on Jun. 23, 1997 including specification, claims, drawings and summary is incorporated herein by reference in its entirety.

What is claimed is:

1. A wireless local area network (LAN) system comprising:
   a first wireless terminal comprising a first modem and a second modem faster than said first modem; and
   a plurality of other wireless terminals, wherein said first wireless terminal transmits a first control frame to and receives a second control frame from said other wireless terminals for connecting a wireless channel therebetween, and transmits data in a data frame to and receives data from said other wireless terminals through said wireless channel,
   wherein said other wireless terminals stop transmission upon receiving said first control frame from said first wireless terminal, said first wireless terminal transmitting said first control frame to and receive said second control frame from said other wireless terminals with said first modem at a first data transfer rate for connecting said wireless channel therebetween, and thereafter transmitting data to and receive data from said other wireless terminals with said second modem, faster than said first modem, at a second date transfer rate greater than said first data transfer rate.

2. A wireless local area network (LAN) system comprising a wireless terminal which transmits a request-to-send (RTS) frame to and receives a clear-to-send (CTS) frame from other wireless terminals for connecting a wireless channel therebetween, and transmits data in a data frame to and receives data from said other wireless terminals through said wireless channel, said other wireless terminals stopping transmission on receiving said RTS frame from said wireless terminal, said wireless terminal being designed to transmit said RTS frame to and receive said CTS frame from said other wireless terminals at a first data transfer rate for connecting wireless channel therebetween, and thereafter transmit data to and receive data from said other wireless terminals at a second date transfer rate greater than said first data transfer rate, wherein said wireless terminal comprises:

(a) a first modem for carrying out modulation and demodulation to accomplish high-rate data transfer;

(b) a second modem for carrying out modulation and demodulation to accomplish low-rate data transfer;

(c) a data processor for carrying out data transmission and receipt, and also for selecting one of said first and second modems; and (d) a radio frequency processor for transmitting a signal transmitted from one of said first and second modems, and also for converting a received signal into a signal to be demodulated by one of said first and second modems.

3. The wireless LAN system as set forth in claim 2, wherein said first modem is a high-rate data transfer modem and second modem is a lower-rate data transfer modem.

4. The wireless LAN system as set forth in claim 2, wherein said data processor is designed to transmit a modem switching signal, and further comprising a switch for alternately switching said first and second modems in accordance with said modem switching signal.

5. A wireless local area network (LAN) system comprising a wireless terminal which transmits a request-to-send (RTS) frame to and receives a clear-to-send (CTS) frame from other wireless terminals for connecting a wireless channel therebetween, and transmits data in a data frame to and receives data from said other wireless terminals through said wireless channel, said other wireless terminals stopping transmission on receiving said RTS frame from said wireless terminal, said wireless terminal being designed to transmit said RTS frame to and receive said CTS frame from said other wireless terminals at a first data transfer rate for connecting wireless channel therebetween, and thereafter transmit data to and receive data from said other wireless terminals at a second date transfer rate greater than said first data transfer rate, wherein said wireless terminal comprises:

(a) a first modem for carrying out modulation and demodulation to accomplish high-rate data transfer;

(b) a second modem for carrying out modulation and demodulation to accomplish low-rate data transfer;

(c) a data processor for carrying out data transmission and receipt, and also for selecting one of said first and second modems; and (d) a radio frequency processor for transmitting a signal transmitted from one of said first and second modems, and also for converting a received signal into a signal to be demodulated by one of said first and second modems, wherein said data processor is designed, when data is to be transmitted, to select said second modem to thereby transmit said request to send (RTS) frame and receive said clear to send (CTS) frame from said other wireless terminals for connecting a wireless channel therebetween, and thereafter, select said first modem to thereby transmit said data frame and receive an acknowledgment (ACK) frame to thereby terminate data transmission.

6. A wireless local area network (LAN) system comprising a wireless terminal which transmits a request-to-send (RTS) frame to and receives a clear-to-send (CTS) frame from other wireless terminals for connecting a wireless channel therebetween, and transmits data in a data frame to and receives data from said other wireless terminals through said wireless channel, said other wireless terminals stopping transmission on receiving said RTS frame from said wireless terminal, said wireless terminal being designed to transmit said RTS frame to and receive said CTS frame from said other wireless terminals at a first data transfer rate for connecting wireless channel therebetween, and thereafter transmit data to and receive data from said other wireless terminals at a second date transfer rate greater than said first data transfer rate, wherein said wireless terminal comprises:

(a) a first modem for carrying out modulation and demodulation to accomplish high-rate data transfer;

(b) a second modem for carrying out modulation and demodulation to accomplish low-rate data transfer;

(c) a data processor for carrying out data transmission and receipt, and also for selecting one of said first and second modems; and (d) a radio frequency processor for transmitting a signal transmitted from one of said first and second modems, and also for converting a received signal into a signal to be demodulated by one of said first and second modems, wherein said data processor is designed, when data is to be received, to select said second modem to thereby receive said request to send (RTS) frame from said other wireless terminals and transmit said clear to send (CTS) frame for connecting a wireless channel therebetween, and thereafter, select said first modem to thereby receive a data frame and transmit an acknowledgment (ACK) frame to thereby terminate data transmission.

7. The wireless LAN system as set forth in claim 2, wherein said first modem transfers data at a rate of at least 4.8 Mbps.

8. The wireless LAN system as set forth in claim 2, wherein said second modem transfers data at a rate of at least 2.0 Mbps.

9. The wireless LAN system as set forth in claim 2, further comprising a second data processor electrically connected to said data processor for providing transmission data to said data processor and receiving data through said data processor.

10. A method of driving a wireless local area network (LAN) system comprising a plurality of wireless terminals including hidden wireless terminals each said wireless terminal including a first modem for carrying out modulation and demodulation to accomplish high-rate data transfer, and a second modem for carrying out modulation and demodulation to accomplish low-rate data transfer, said method comprising the steps of:

(a) selecting said second modem for transmitting a request to send (RTS) frame and receiving a clear to send (CTS) frame from other wireless terminals to thereby connect a wireless channel therebetween; and (b) selecting said first modem for transmitting a data frame and receiving an acknowledgment (ACK) frame to thereby terminate data transmission, wherein a hidden wireless terminal is prevented from transmitting until said ACK frame is received.

11. A method of driving wireless a local area network (LAN) system comprising a plurality of wireless terminals including hidden wireless terminals each said wireless terminal including a first modem for carrying out modulation and demodulation to accomplish high-rate data transfer, and a second modem for carrying out modulation and demodulation to accomplish low-rate data transfer, said method comprising the steps of:

(a) selecting said second modem for receiving a request to send (RTS) frame from other wireless terminals and transmitting a clear to send (CTS) frame to thereby connect a wireless channel therebetween, and (b) selecting said first modem for receiving a data frame and transmitting an acknowledgment (ACK) frame to thereby terminate data transmission, wherein a hidden wireless terminal is prevented from transmitting until said ACK frame is received.

* * * * *